United States Patent
Ahluwalia et al.

(10) Patent No.: US 10,057,391 B2
(45) Date of Patent: Aug. 21, 2018

(54) ACCELERATION OF GTP TRAFFIC FLOWS, OVER A SATELLITE LINK, IN A TERRESTRIAL WIRELESS MOBILE COMMUNICATIONS SYSTEM

(71) Applicant: Hughes Network Systems, LLC, Germantown, MD (US)

(72) Inventors: Sandeep Ahluwalia, Gaithersburg, MD (US); George Choquette, Potomac, MD (US); Charles Barnett, Ashburn, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 102 days.

(21) Appl. No.: 14/792,199

(22) Filed: Jul. 6, 2015

(65) Prior Publication Data
US 2016/0192235 A1 Jun. 30, 2016

Related U.S. Application Data

(60) Provisional application No. 62/097,067, filed on Dec. 27, 2014.

(51) Int. Cl.
| | |
|---|---|
| *H04L 12/28* | (2006.01) |
| *H04L 29/06* | (2006.01) |
| *H04B 7/185* | (2006.01) |
| *H04L 12/46* | (2006.01) |
| *H04W 28/14* | (2009.01) |
| *H04L 12/801* | (2013.01) |
| *H04W 88/18* | (2009.01) |
| *H04W 28/06* | (2009.01) |
| *H04W 84/06* | (2009.01) |

(52) U.S. Cl.
CPC ......... *H04L 69/22* (2013.01); *H04B 7/18515* (2013.01); *H04L 12/4633* (2013.01); *H04L 47/193* (2013.01); *H04L 47/34* (2013.01); *H04W 28/14* (2013.01); *H04W 28/06* (2013.01); *H04W 84/06* (2013.01); *H04W 88/182* (2013.01)

(58) Field of Classification Search
CPC ....................................................... H04L 69/22
USPC ....................................................... 370/329
See application file for complete search history.

(56) References Cited

U.S. PATENT DOCUMENTS

| | | | | |
|---|---|---|---|---|
| 2011/0002240 A1* | 1/2011 | Harel | ...................... | H04L 45/02 370/254 |
| 2015/0341285 A1* | 11/2015 | Aysola | ................ | H04L 63/0428 370/392 |
| 2015/0382240 A1* | 12/2015 | Hecht | ...................... | H04L 69/22 370/316 |

* cited by examiner

*Primary Examiner* — Dang Ton
(74) *Attorney, Agent, or Firm* — Potomac Technology Law, LLC

(57) ABSTRACT

An approach is provided for the application of network acceleration technologies to remote node traffic over GPRS tunneling protocols (GTP) in terrestrial mobile communications networks. A proxy device of a first network node receives a stream of data packets that are encapsulated in accordance with GTP. Each GTP packet is de-encapsulated by stripping GTP header from the packet, identifying the TEID (reflecting a respective GTP flow with which the GTP packet is associated), and maintaining a respective GTP payload (PDU). Acceleration functions are applied to the GTP PDUs, and the resulting acceleration packets are transmitted communications network link(s) to a proxy of a second network node. The second node proxy device receives the transmitted packets, and re-encapsulates each packet, in accordance with the GTP protocol, based at least in part on the respective TEID of the packet.

22 Claims, 7 Drawing Sheets

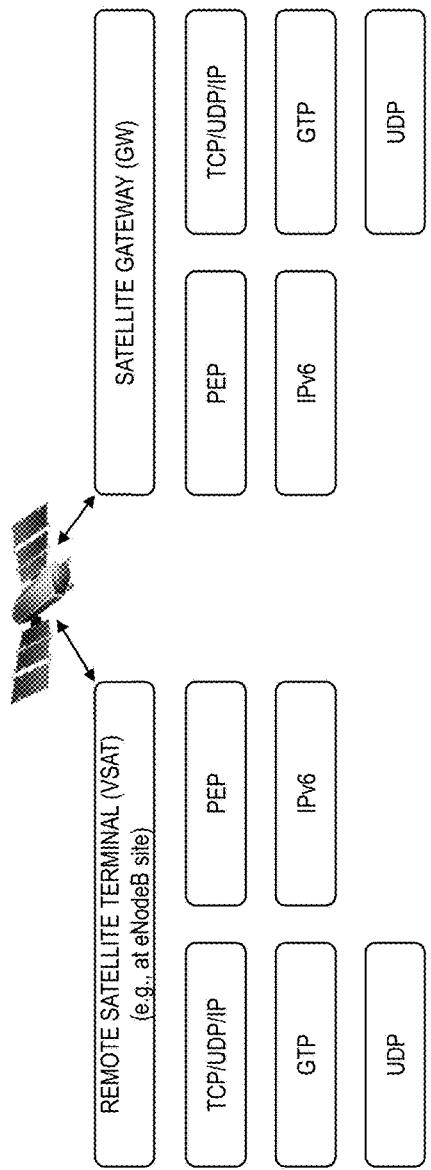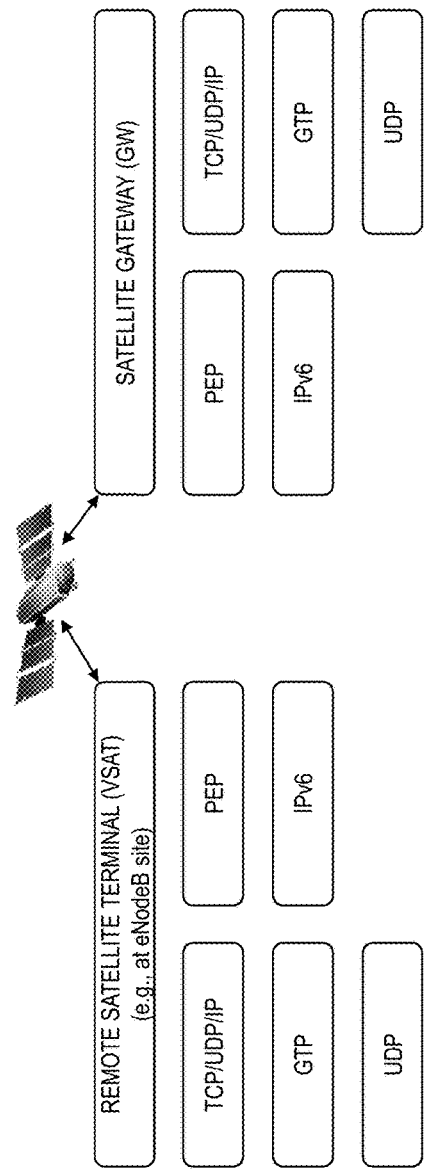

ACCELERATION OF GTP TRAFFIC FLOWS, OVER A SATELLITE LINK, IN A TERRESTRIAL WIRELESS MOBILE COMMUNICATIONS SYSTEM

RELATED APPLICATIONS

This application claims the benefit under 35 U.S.C. § 119(e) of the filing date of U.S. Provisional Patent Application Ser. No. 62/097,067 (filed Dec. 27, 2014), the entirety of which is incorporated herein by reference.

BACKGROUND

Terrestrial mobile communication systems continue to provide higher and higher speed and more data intensive multimedia services to end-users (e.g., voice, data, video, images, high definition media services, etc.). Such services (e.g., Third Generation (3G) services and Fourth Generation (4G or LTE)) also accommodate differentiated quality of service (QoS) across various applications. To facilitate this, terrestrial architectures are moving towards an end-to-end all-Internet Protocol (IP) architectures that unify the services, including voice, over the IP bearer. With the advances in processing power of mobile terminals, the average user has grown accustomed to sophisticated applications and services (e.g., streaming video, radio broadcasts, video games, high definition media, etc.), which place tremendous strain on network resources. The Internet as well as other communications services rely on protocols and networking architectures that offer great flexibility and robustness. Such infrastructure, however, may be inefficient in supporting the demands and traffic loads of such sophisticated applications and services.

Third generation (3G) mobile communications networks (e.g., Universal Mobile Telecommunications System (UMTS)) generally employ technologies comprising a hybrid of circuit and packet switching. In contrast, the current fourth generation (4G) networks (e.g., Long Term Evolution (LTE)/System Architecture Evolution (SAE)) generally employ only packet-switched services, using an all-IP architecture with well-defined interworking with circuit-switched systems. SAE is the core network architecture of the LTE wireless communication standard. Together the LTE and the SAE comprise the Evolved Packet System (EPS).

The LTE mobile network provides seamless Internet Protocol (IP) connectivity between user equipment (UE) (the subscriber) and the PDN. Further, the LTE mobile network provides for higher bandwidths, better spectrum efficiency, wider coverage and full interworking with other access/backend systems, and provides for significantly higher data rates, at a significantly lower cost per bit for the Operator (e.g., end user download rates in excess of 150 Mbps are achievable where conditions allow). Such enhanced bandwidth and spectrum efficiency, coupled with the resulting more affordable high-end services for the subscriber, contributes to mounting issues with regard to the backhaul of data and signaling communications from remote eNodeB's back to the respective core network. In addition to user plane traffic from the various user terminals served by a given eNodeB at any given moment, the eNodeB backhaul traffic comprises a number of additional components, such as control plane signaling, and transport protocol overhead (tunneling protocol overhead, for the tunneling that enables the user terminal to maintain the same IP address across eNodeB's and gateways). Generally, 4G LTE networks employ general packet radio service (GPRS) tunneling protocol (GTP) to transport user data packets over the mobile backhaul between the base stations and core network elements. GPRS tunneling protocol consists of a group of IP-based communications protocols used to carry general packet radio service (GPRS) within GSM, UMTS and LTE networks. Maintaining the tunnel as the user equipment moves, however, requires heavy signaling, and the protocol stack effectively adds headers and thus introduces overhead.

Accordingly, LTE and other terrestrial mobile data networks require a significant amount of backhaul bandwidth, especially during peak times. Moreover, in view of the fact that the eNodeB's cover the local cells of the subscribers, they are deployed all across the geographical network coverage area, which includes remote sites that are long distances from the respective core network. Thus, due to the vast number of eNodeB's and the vast geographical distribution of them, it is often neither feasible nor cost effective to deploy dedicated high-speed terrestrial backhaul links (e.g., fiber or cable), or high-speed microwave, to every node. As a result, satellite networks are becoming more favorable as solutions for the eNodeB backhaul issues in LTE and other terrestrial mobile communications systems. Satellite communications systems generally possess sufficient bandwidth to handle such backhaul traffic. One drawback of satellite networks, however, is a relatively long signaling delay and higher costs per bit, as compared to terrestrial links. One solution that aids in reducing the delay factor in satellite networks is acceleration technology, such as performance enhancing proxies (PEPs) and HTTP acceleration techniques. PEP and HTTP acceleration techniques, however, cannot be directly applied to the mobile network backhaul traffic, because the traffic is carried over multiple GTP flows.

What is needed, therefore, is an approach to facilitate the application of network acceleration technologies, such as performance enhancing proxies (PEPs) and HTTP acceleration techniques, to remote node backhaul traffic carried over GPRS tunneling protocols in terrestrial mobile communications networks.

SOME EXAMPLE EMBODIMENTS

Embodiments of the present invention advantageously address the foregoing requirements and needs, as well as others, by providing an approach to facilitate the application of network acceleration technologies, such as performance enhancing proxies (PEPs) and HTTP acceleration techniques, to remote node backhaul traffic carried over GPRS tunneling protocols in terrestrial mobile communications networks.

In accordance with example embodiments a method for the application of acceleration technologies to remote node backhaul traffic carried over GPRS tunneling protocols is provided. A device of a first node of a communications network receives a stream of data packets that are encapsulated in accordance with general packet radio service tunneling protocol (GTP). Each GTP data packet is de-encapsulated by stripping GTP header information from the packet, identifying a tunnel endpoint identifier (TEID) reflecting a respective GTP flow with which the GTP packet is associated, and maintaining a respective GTP payload packet data unit (PDU). One or more acceleration functions are applied to the GTP payload PDUs, and transmitting the resulting acceleration PDU packets over one or more links of the communications network to a device of a second node of the communications network. For each acceleration PDU packet the respective TEID is communicated to the device of the second node for re-encapsulation of the packet in accordance with the GTP protocol. According to further embodiments, The device of the second node of the communications network receives the transmitted acceleration PDU packets. Each received PDU packet is re-encapsulated, in accordance with the GTP protocol, based at least in part on the respective TEID of the packet. According to further embodiments, The de-encapsulated GTP payload PDUs are grouped into separate transmission groups based on a respective type of each PDU, wherein the application of the acceleration functions to the GTP payload PDUs comprises applying one or more acceleration functions to each PDU group based on the PDU types contained within the group. Further, the transmission of the resulting acceleration PDU packets of each group over the links of the communications network may be performed in a channelized manner based on the acceleration function(s) applied to the group.

By way of example, the device of the first node comprises a performance enhancing proxy (PEP) device of a user equipment (UE) node of the communications network, and the device of the second node comprises a PEP device of a core network node of the communications network. By way of further example, the communications network comprises a terrestrial radio frequency (RF) communications network (such as a terrestrial cellular network), having a microwave communications network (such as a satellite network) as the communications link(s) between the device of the first node and the device of the second node. By way of Further example, the acceleration functions comprise one or more of a performance enhancing proxy (PEP) handshake and message acknowledgement spoofing function, a hypertext transfer protocol (HTTP) acceleration function, a website prefetch function, and a data compression function.

In accordance with further example embodiments an apparatus, of a first node of a communications network, is provided. The apparatus comprises a receiver configured to receive a stream of data packets that are encapsulated in accordance with general packet radio service tunneling protocol (GTP). The apparatus further comprises a processor configured to de-encapsulate each GTP data packet by stripping GTP header information from the packet, identifying a tunnel endpoint identifier (TEID) reflecting a respective GTP flow with which the GTP packet is associated, and maintaining a respective GTP payload packet data unit (PDU). The apparatus further comprises an acceleration processor configured to apply one or more acceleration functions to the GTP payload PDUs. The apparatus further comprises a transmitter configured to transmit the resulting acceleration PDU packets over one or more links of the communications network to a device of a second node of the communications network. Wherein, for each acceleration PDU packet, the respective TEID is communicated to the device of the second node for re-encapsulation of the packet in accordance with the GTP protocol. According to further embodiments, the processor is further configured to group the de-encapsulated GTP payload PDUs into separate transmission groups based on a respective type of each PDU, and wherein the acceleration processor is further configured to apply the acceleration functions to the GTP payload PDUs by applying one or more acceleration functions to each PDU group based on the PDU types contained within the group. According to further embodiments, the transmitter is further configured to transmit the resulting acceleration PDU packets of each group over the links of the communications network in a channelized manner based on the acceleration function(s) applied to the group.

By way of example, the apparatus comprises a performance enhancing proxy (PEP) device of a user equipment (UE) node of the communications network, and the device of the second node comprises a PEP device of a core network node of the communications network. By way of further example, the communications network comprises a terrestrial radio frequency (RF) communications network (such as a terrestrial cellular network), having a microwave communications network (such as a satellite network) as the communications link(s) between the apparatus of the first node and the device of the second node. By way of further example, the acceleration functions comprise one or more of a performance enhancing proxy (PEP) handshake and message acknowledgement spoofing function, a hypertext transfer protocol (HTTP) acceleration function, a website prefetch function, and a data compression function.

In accordance with further example embodiments a communications network comprises a first device of a first node of the communications network, and a second device of a second node of the communications network. The first device of the first network node comprises a receiver configured to receive a stream of data packets that are encapsulated in accordance with general packet radio service tunneling protocol (GTP), a processor configured to de-encapsulate each GTP data packet by stripping GTP header information from the packet, identifying a tunnel endpoint identifier (TEID) reflecting a respective GTP flow with which the GTP packet is associated, and maintaining a respective GTP payload packet data unit (PDU), an acceleration processor configured to apply one or more acceleration functions to the GTP payload PDUs, and a transmitter configured to transmit the resulting acceleration PDU packets over one or more links of the communications network to the second node of the communications network. The second device of the second network node comprises a receiver configured to receive the acceleration PDU packets transmitted by the first device over the one or more links of the communications network, a processor configured to re-encapsulate each received PDU packet, in accordance with the GTP protocol, based at least in part on the respective TEID of the packet. According to further embodiments, the processor of the first device is further configured to group the de-encapsulated GTP payload PDUs into separate transmission groups based on a respective type of each PDU, and wherein the acceleration processor of the first device is further configured to apply the acceleration functions to the GTP payload PDUs by applying one or more acceleration functions to each PDU group based on the PDU types contained within the group. According to further embodiments, the transmitter of the first device is further configured to transmit the resulting acceleration PDU packets of each group over the links of the communications network in a channelized manner based on the acceleration function(s) applied to the group.

By way of example, the first device of the first network node includes a performance enhancing proxy (PEP) device of a user equipment (UE) node of the communications network, and the second device of the second network node includes a PEP device of a core network node of the communications network. By way of further example, the network comprises a terrestrial radio frequency (RF) communications network (such as a terrestrial cellular network), having a microwave communications network (such as a satellite network) as the communications link(s) between the apparatus of the first node and the device of the second node. By way of further example, the acceleration functions comprise one or more of a performance enhancing proxy (PEP)

handshake and message acknowledgement spoofing function, a hypertext transfer protocol (HTTP) acceleration function, a website pre-fetch function, and a data compression function.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings and in which like reference numerals refer to similar elements, and in which:

FIG. 4A illustrates performance enhancing proxy (PEP) acceleration of GTP tunnel traffic over a satellite link, in accordance with example embodiments of the present invention;

FIG. 4B illustrates HTTP acceleration of GTP tunnel traffic over a satellite link, in accordance with example embodiments of the present invention;

DETAILED DESCRIPTION

A system and methods for the application of network acceleration technologies, such as performance enhancing proxies (PEPs) and HTTP acceleration techniques (e.g., http pre-fetching), to remote node backhaul traffic carried over GPRS tunneling protocols, in terrestrial mobile communications networks, are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
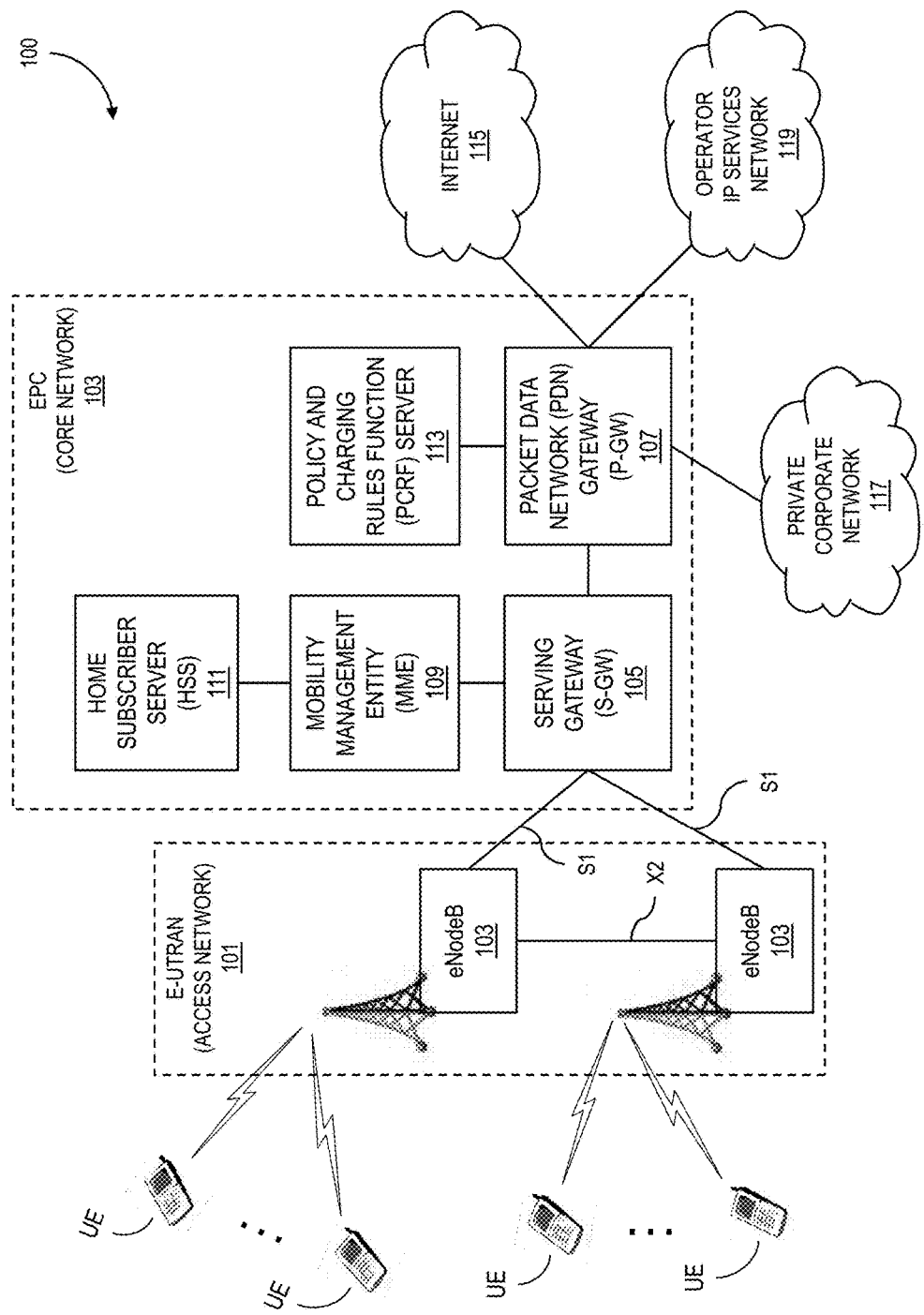
FIG. 1 illustrates a block diagram of a typical LTE or 4G terrestrial mobile communications system.

FIG. 1 illustrates a high-level block diagram of a typical LTE or 4G terrestrial mobile communications system 100. Third generation (3G) mobile communications networks (e.g., Universal Mobile Telecommunications System (UMTS)) generally employ technologies comprising a hybrid of circuit and packet switching. In contrast, the current fourth generation (4G) networks (e.g., Long Term Evolution (LTE)/System Architecture Evolution (SAE)) generally employ only packet-switched services, using an all-IP architecture with well-defined interworking with circuit-switched systems. SAE is the core network architecture of the LTE wireless communication standard. Together the LTE and the SAE comprise the Evolved Packet System (EPS). At a high level, the LTE network is comprised of two distinct components, the access network 101 and the core network 103. The access network comprises an evolution of the UMTS radio access via the Evolved Universal Terrestrial Radio Access Network (E-UTRAN) 101, and the core network comprises a fully packet-switched all-IP core network, the Evolved Packet Core (EPC) 103.

The E-UTRAN 101 handles the radio communications between the mobile user terminal (UT) or user equipment (UE) and the EPC, and is comprised of the evolved base stations 103 (referred to as the eNodeB). Each eNodeB is a base station that controls the mobiles in one or more cells, where the base station that is communicating with a mobile is known as its serving eNodeB. Each eNodeB connects with the EPC by means of the S1 interface, and can also be connected to nearby base stations by the X2 interface (e.g., for signaling and packet forwarding during handover from one eNodeB to the other). The evolved packet core (EPC) generally comprises the serving gateway (S-GW) 105, the packet data network (PDN) gateway (P-GW) 107, the mobility management entity (MME) 109, and the home subscriber server (HSS) 111. The EPC communicates with external packet data networks (PDNs), such as the Internet 115, private corporate networks 117, an IP services network 119, etc. The eNodeB's interface with the EPC via the serving gateway (S-GW), which acts as a router, and forwards data between the base station and the packet data network (PDN) gateway (P-GW). All user IP packets are transferred through the S-GW, which serves as the local mobility anchor for the data bearers when the UE moves between eNodeB's.

The P-GW communicates with external IP networks (PDNs), serving as the termination point of the packet data interface towards the PDNs. The P-GW generally serves the same functions as the GPRS support node (GGSN) and the serving GPRS support node (SGSN) within UMTS and GSM systems. The PDN Gateway is responsible for IP address allocation for the UEs, as well as quality of service (QoS) enforcement (e.g., the filtering of downlink user IP packets into the different QoS-based bearers). The P-GW also controls flow-based charging according to rules from the policy and charging rules function (PCRF) server 113. In other words, the P-GW supports policy enforcement features (which apply operator-defined rules for resource allocation and usage) as well as packet filtering (like deep packet inspection for virus signature detection) and evolved charging support (like per URL charging). The MME controls high-level operations of the UEs by means of signaling messages and the HSS, which is a central database containing relevant information about the network subscribers.

The LTE mobile network provides seamless Internet Protocol (IP) connectivity between user equipment (UEs) (the subscribers) and the PDN. Further, the LTE mobile network provides for higher bandwidths, better spectrum efficiency, wider coverage and full interworking with other access/backend systems, and provides for significantly higher data rates, at a significantly lower cost per bit for the Operator (e.g., end user download rates in excess of 150 Mbps are achievable where conditions allow). Such enhanced bandwidth and spectrum efficiency, coupled with the resulting more affordable high-end services for the subscriber, contributes to mounting issues with regard to the backhaul of data and signaling communications from the eNodeB's back to the respective core network or EPC. In addition to user plane traffic from the various UEs served by a given eNodeB at any given moment, the eNodeB backhaul traffic comprises a number of additional components, such as control plane signaling, and transport protocol overhead (tunneling protocol overhead, for the tunneling that enables the UE to maintain the same IP address across eNodeB's and gateways). Generally, 4G LTE networks employ GPRS tunneling protocol (GTP) to transport user data packets over the mobile backhaul between the base stations and core network elements. GPRS tunneling protocol is a group of IP-based communications protocols used to carry general packet radio service (GPRS) within GSM, UMTS and LTE networks. Maintaining the tunnel as the user equipment moves, however, requires heavy signaling, and the protocol stack effectively adds headers and thus introduces overhead.

Figure 2:
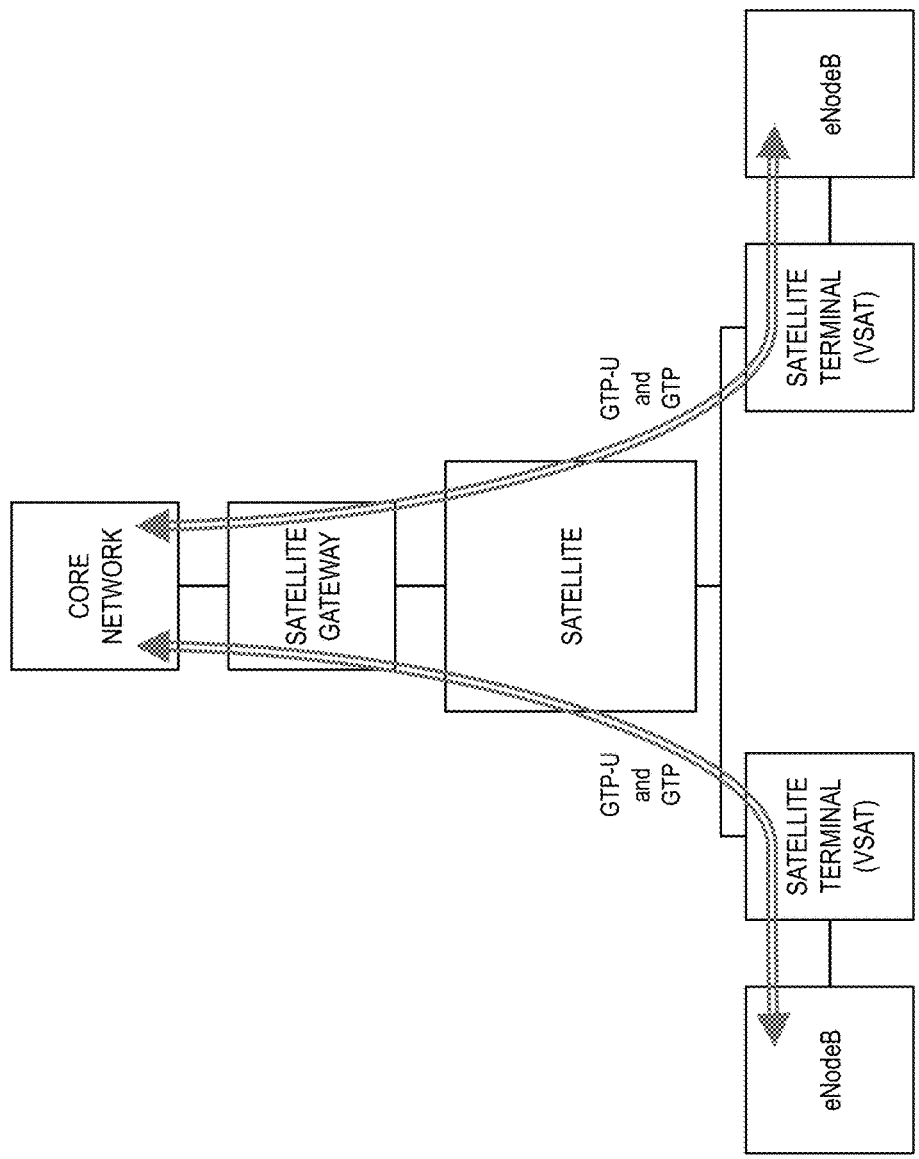
FIG. 2 illustrates a block diagram depicting multiple GTP traffic flow communications over a satellite link between eNodeB's and the core network of an LTE or 4G terrestrial mobile communications system.

Accordingly, LTE and other terrestrial mobile data networks require a significant amount of backhaul bandwidth, especially during peak times. Moreover, in view of the fact that the eNodeB's cover the local cells of the subscribers, they are deployed all across the geographical network coverage area, which includes remote sites that are long distances from the respective EPC/core network. Thus, due to the vast number of eNodeB's and the vast geographical distribution of them, is often neither feasible nor cost effective to deploy dedicated high-speed terrestrial backhaul links (e.g., fiber or cable), or high-speed microwave, to every node. As a result, satellite networks are becoming more favorable as solutions for the eNodeB backhaul issues in LTE and other terrestrial mobile communications systems. The drawback of satellite communications is the relatively long delay and higher costs per bit, as compared to terrestrial links. One solution that aids in reducing the delay factor in satellite networks is acceleration technology, such as performance enhancing proxies (PEPS) and HTTP acceleration techniques. PEP and HTTP acceleration techniques, however, cannot be directly applied to the mobile network backhaul traffic, because the traffic is carried over multiple GTP flows. FIG. 2 illustrates a block diagram depicting multiple GTP traffic flow communications over a satellite link between eNodeB's and the core network of an LTE or 4G terrestrial mobile communications system. Each eNodeB is interfaced with a satellite terminal (VSAT) for communication with the core network over satellite channels. For example, each eNodeB transmits and receives GTP/GTP-U data traffic flows to and from the core network via a respective satellite channel. Correspondingly, the core network receives multiple GTP/GTP-U data traffic flows from respective eNodeB's, and transmits multiple GTP/GTP-U data traffic flows to the respective eNodeB's, via respective satellite channels. The core network is interfaced with a satellite gateway via which it transmits and receives such data traffic flows.

In accordance with example embodiments of the present invention, therefore, approaches are provided for the application of network acceleration (e.g., HTTP acceleration and PEP functions) to network backhaul traffic carried over GTP traffic flow tunnels. In accordance with one embodiment, a GTP traffic tunnel is completely terminated at one end of the satellite link, and the respective acceleration functions (e.g., PEP and HTTP acceleration) are applied to the GTP traffic packet payloads. The accelerated packets are transmitted over the satellite link, and the GTP layer is then regenerated at the other end of the satellite link (at the remote end). By way of example, GTP sequence numbers are regenerated at the remote end, and GTP tunnel identifiers are preserved across the satellite interface. Further, since the GTP layer is regenerated, there is no requirement to preserve packet boundaries and sequences across the satellite interface or link. By way of further example, the regenerated GTP traffic may be ordered and organized in accordance with respective requirements of the applied acceleration functions. By way of further example, GTP headers need not explicitly be carried over the interface, which provides for improved spectral efficiency over the satellite link. Accordingly, example embodiments provide for acceleration of GTP backhaul traffic, over a satellite network, in an LTE terrestrial mobile communications system, whereby quality of service (QoS) in data services (e.g., Internet browsing) provided via the system can be maintained at comparable levels as compared to a system with GTP backhaul traffic carried over terrestrial links. Further, in accordance with such example embodiments, the satellite interface for the accelerated GTP backhaul services is provided to LTE system service providers in a transparent manner (e.g., backwards compatibility is maintained for the existing GTP traffic protocols of the LTE networks).

Figure 3:
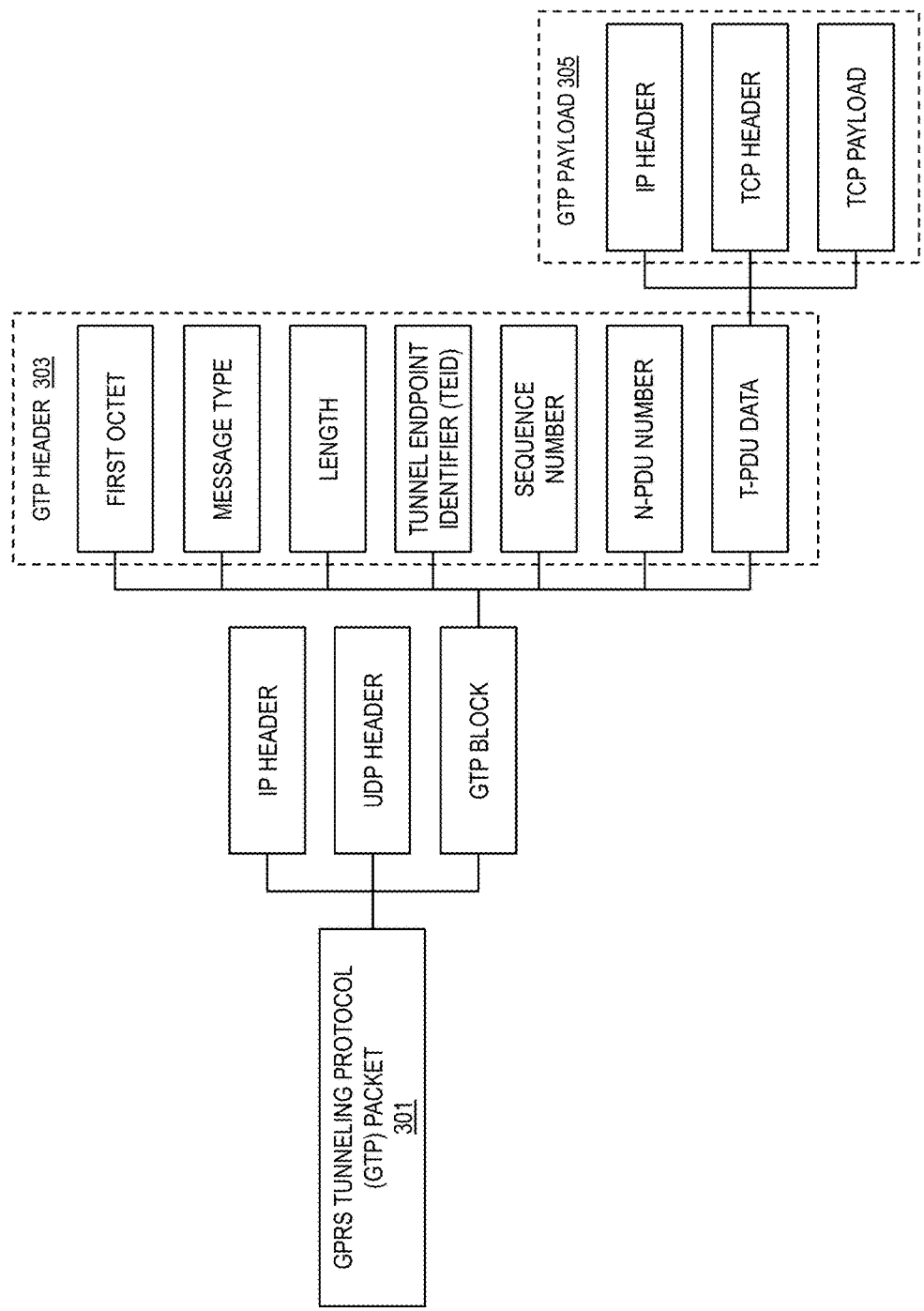
FIG. 3 illustrates a block diagram depicting the structure of a general packet radio service tunneling protocol (GTP) packet carrying a TCP segment.

FIG. 3 illustrates a block diagram depicting the structure of a general packet radio service tunneling protocol (GTP) packet carrying a TCP segment. The details of the GPRS tunneling protocol are specified in the European Telecommunications Standards Institute (ETSI) technical specifications, as follows:

(1) ETSI TS 129 060—Digital cellular telecommunications system (Phase 2+); Universal Mobile Telecommunications System (UMTS); General Packet Radio Service (GPRS); GPRS Tunnelling Protocol (GTP) across the Gn and Gp interface (2) ETSI TS 129 274—Universal Mobile Telecommunications System (UMTS); LTE; 3GPP Evolved Packet System (EPS); Evolved General Packet Radio Service (GPRS) Tunnelling Protocol for Control plane (GTPv2-C);

(3) ETSI TS 129 281—Universal Mobile Telecommunications System (UMTS); LTE; General Packet Radio System (GPRS) Tunnelling Protocol User Plane (GTPv1-U).

At an overview level, the GTP packet 301 generally comprises an IP header, UDP header and the GTP block. The GTP block comprises the GTP header 303 and the GTP payload 305 (the packet data). The GTP header generally comprises a first octet, a message-type field, a length field, a tunnel endpoint identifier, a sequence number, an N-PDU number and the T-PDU data (which consists of the GTP payload 305). The GTP payload generally comprises (in the case of a TCP segment) an IP header, a TCP header and the TCP packet payload (the packet data). Alternatively, with other packet data protocols, the GTP payload would comprise such header and payload structures as required by the respective protocol specification. The GTP-U header is a variable length header whose minimum length is 8 bytes. There are three flags that are used to signal the presence of additional optional fields: the PN flag, the S flag and the E flag. The PN flag is used to signal the presence of N-PDU Numbers. The S flag is used to signal the presence of the GTP Sequence Number field. The E flag is used to signal the presence of the Extension Header field, used to enable future extensions of the GTP header, without the need to use another version number. All the bits of any unused fields are set to zero. The control plane GTP uses a variable length header of a multiple of 4 octets. Similar to the GTP-U header, the GTP-C header includes flag bits that signal the presence of additional optional fields.

GTP-U represents the GTP protocol for user plane data packets and GTP-C represents the GTP protocol for control plane data packets. The GTP-C protocol is the control section of the GTP standard. When a user terminal (UT) or user equipment (UE) requests a PDP context, the SGSN will send a create PDP context request GTP-C message to the GGSN providing details of the request. The GGSN will then respond with a create PDP context response GTP-C message which will either give details of the PDP context actually activated or will indicate a failure and give a reason for that failure. The eGTP-C (or, GTPv2-C) protocol is responsible for creating, maintaining and deleting tunnels on multiple Sx interfaces. It is used for the control plane path management, tunnel management and mobility management. It also controls forwarding relocation messages, such as SRNS context and creating forward tunnels during inter LTE handovers. The GTP-U protocol is an IP-based tunneling protocol that facilitates multiple tunnels between a respective set of endpoints. Each UT or UE will have one or more tunnels, one for each respective active PDP context of the terminal, as well as possibly having separate tunnels for specific connections with different quality of service requirements. Each separate tunnel is identified by a respective tunnel endpoint identifier (TEID) included in the GTP-U packet headers (as discussed above). The GTPv1-U protocol is used to exchange user data over GTP tunnels across the Sx interfaces. An IP packet for a UE is encapsulated in an GTPv1-U packet and tunneled between the core network gateway and the eNodeB for transmission of UE user data traffic over the corresponding network interfaces.

With reference to FIG. 3, the following outlines certain octet fields of the GTP header 303. These octet fields are common to both the GTP-C and GTP-U headers. The first octet of the GTP header includes a version field that identifies the version of the GTP protocol employed, along with the flag bits that signal the presence of additional optional fields The message-type field indicates the type of the GTP message (the different types of messages are defined in 3GPP TS 129 060, which are summarized in Table 1 of Section 7.1). The length field comprises a 16-bit field that indicates the length in octets of the GTP payload (the rest of the packet following the first 8 octets of the GTP header— the Sequence Number, the N-PDU Number and/or any Extension headers are considered as part of the payload, and are included in the length identifier). The TEID identifies a tunnel endpoint in the receiving GTP protocol entity. The receiving end side of a GTP tunnel locally assigns the TEID value that the transmitting side is required to use (the TEID is used by the receiving entity to find the corresponding PDP context). In GTP-U, the Sequence Number is present when indicated by the S-flag in the first octet. The Sequence Number field is used for G-PDUs (T-PDUs+headers) when transmission order must be preserved, and then an increasing sequence number for T-PDUs is transmitted via a GTP-U tunnel. The N-PDU Number field is used at the Inter SGSN Routing Area Update procedure and some inter-system handover procedures (e.g., between 2G and 3G radio access networks). This field is used to co-ordinate the data transmission for acknowledged mode of communication between the MS and the SGSN. The exact meaning of this field depends upon the scenario (e.g., for GSM/GPRS to GSM/GPRS, the SNDCP N-PDU number is present in this field). The T-PDU data consists of the GTP payload 305.

FIG. 4A illustrates performance enhancing proxy (PEP) acceleration of GTP tunnel traffic over a satellite link, and FIG. 4B illustrates HTTP acceleration of GTP tunnel traffic over a satellite link, in accordance with example embodiments of the present invention.

Figure 5A:
FIG. 5A illustrates the flow for a process of applying a performance enhancing proxy to a GTP traffic flow over a satellite link, in accordance with example embodiments of the present invention.

FIG. 5A illustrates the flow for a process of applying a performance enhancing proxy functions (e.g., TCP handshake or ACK spoofing) to a GTP traffic flow over a satellite link, in accordance with example embodiments of the present invention. Examples of performance enhancing proxy functions (e.g., TCP spoofing) are described, for example, in U.S. Pat. Nos. 6,161,141, 6,338,131, 6,701,370, 7,006,480, 6,973,497, 7,213,077, 7,219,158. First, packets of a GTP tunneled traffic flow are received and processed (S501). During this step, the GTP tunnel is terminated by extracting the packet payload. The GTP payload is determined and extracted based on the GTP header. More specifically, the GTP header fields, which identify the packet length and the fields included in the header, and thereby enable a determination of the length and location of the GTP payload 305 within the packet. As a further part of the payload extraction, the TEID is extracted from the GTP header and the GTP sequence number is validated. The GTP payload (which effectively consists of the IP segment) is passed to the performance enhancing proxy (PEP) layer, where the PEP functions are applied to the extracted GTP payload (S503), in the same manner that such functions would be applied to any IP packet. The tunnel identifier or TEID is also included with the IP message segment passed to the PEP layer (the GTP tunnel identifier is transmitted for every UDP/IP message and every spoofed TCP connection). Communicating the TEID over the satellite link (within the PEP function) may be accomplished via various alternate implementations that could be devised by one of skill in the art. As one example, the TEID may be communicated to the remote end (e.g., in the case of transmissions from the eNodeB to the core network, the remote end would be the satellite gateway interfaced with the core network) via handshake messaging employed for establishing the particular PEP session or connection. More specifically, when the PEP peer at the local end of the satellite link (the eNodeB satellite terminal) is accelerating a GTP tunnel data flow, the eNodeB satellite terminal may notify the core network satellite gateway that the connection is for a GTP data flow and provide the respective TEID via the initial PEP connection set-up handshaking. Alternatively, the respective TEID may be included with each PEP packet transmitted over the satellite link.

In accordance with example embodiments, the PEP functions may include TCP acceleration. By way of example, the TCP acceleration function may include spoofing of the TCP 3-way handshake, and end-to-end spoofing the TCP acknowledgments (ACKs) to reduce the handshaking traffic carried over the satellite link. In this context, the satellite terminal at the eNodeB would serve as the TCP proxy to the client applications of the UEs, and the satellite gateway at the core network would serve as the TCP proxy to the core network. By way of further example, the TCP acceleration may include multiple tunneled connections on a common set of prioritized backbones, TCP window management and DNS pre-fetch and caching. In accordance with further example embodiments, the PEP function may include IP/UDP/TCP header and payload compression for tunneled packets, tunneled traffic classification (e.g., protocol, port, source, destination, DSCP, size), and tunneled traffic shaping, policing and prioritization based on classification, DNS query response from DNS cache on the satellite terminal (VSAT), slip buffer to minimize jitter based on classification.

Once the PEP functions are applied to the extracted GTP payload or IP segment/packet, the resulting packets (the PEP backbone traffic) are transmitted over the satellite link (S505). At the receiving end, the PEP functions are terminated (S507) for each packet, and (in the case where each packet includes the respective TEID) the tunnel identifier or TEID is received and determined. The PEP layer on the remote end terminates the PEP protocol layer and passes on the GTP tunnel identifier to the GTP regeneration layer. For example, in the case of the core network satellite gateway, acting as the PEP proxy for the core network, the satellite gateway performs all corresponding functions required to terminate the PEP functions and format the traffic flows and generate the requisite handshaking that will be expected by the core network and further networks (e.g., the Internet). Finally, after termination of the PEP functions, the resulting IP segment packets are passed on to the GTP regeneration layer, where the received data is re-encapsulated into GTP T-PDUs (S509). By way of example, as part of this step, a new GTP header is created with the proper TEID, and a new sequence number may be assigned to the packet. In this context, because the GTP tunnel was terminated at the transmitting end, there may not be (and need not be) a one-to-one correspondence between the GTP packets received at the transmitting end and the PEP accelerated packets received at the receiving end. In other words, because the GTP protocol is terminated at the source or transmitting end, there is no correlation between the GTP packets received at the source end and the accelerated packets received at the remote end over the satellite link (except for tracking of the TEID for maintaining the proper PDP context for each GTP flow. Then, at the receiving end, GTP encapsulation is performed as packets are being received, maintaining the proper TEID and generating a new sequence number for each re-encapsulated packet. Additionally, a new length field is generated, based on the GTP protocol specifications, reflecting the length of the GTP packet that results from the GTP re-encapsulation of the received packets. Accordingly, by way of further example, the receiving node (e.g., the satellite gateway at the core network or a satellite terminal at an eNodeB site) tracks and controls the regenerated GTP packet sequencing that will be applied for purposes of further transmissions through the network (e.g., transmission by the satellite gateway on to the core network, or transmission by the eNodeB VSAT on to the UEs). The re-encapsulated GTP tunnel packets are then transmitted further through the network (e.g., in the case of the core network satellite gateway, transmitted on to the core network, or, in the case of the satellite terminals at the eNodeB sites, transmitted on to the UEs)(S509).

Figure 5B:
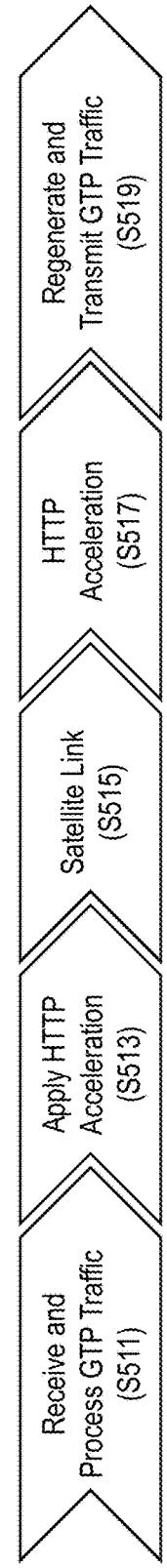
FIG. 5B illustrates the flow for a process of applying an HTTP acceleration process to a GTP traffic flow over a satellite link, in accordance with example embodiments of the present invention.

FIG. 5B illustrates the flow for a process of applying an HTTP acceleration process (e.g., an HTTP pre-fetch process) to a GTP traffic flow over a satellite link, in accordance with example embodiments of the present invention. First, as with the application of PEP illustrated in FIG. 5A, packets of a GTP tunneled traffic flow are received and processed (S511). During this step, the GTP tunnel is terminated by extracting the packet payload. The GTP payload is determined and extracted based on the GTP header. As a further part of the payload extraction, the TEID is extracted from the GTP header and the GTP sequence number is validated. The GTP payload (which effectively consists of the IP segment) is passed to the HTTP acceleration layer, where the HTTP acceleration functions are applied to the extracted GTP payload (S513). The tunnel identifier or TEID may also be included with the IP message segment passed to the HTTP acceleration layer. As discussed above, the GTP tunnel identifier may be transmitted for every UDP/IP message or packet or may be transmitted/established at the initiation of each HTTP accelerated user session.

In accordance with example embodiments, the HTTP acceleration functions may include pre-fetching of embedded web page content. By way of example, in the case of a web-browsing application running on a UE, embedded links from a requested web-page may be pre-fetched at the core network end (e.g., by the satellite gateway acting as an HTTP acceleration proxy). In this context, the satellite gateway parses the requested web page (identifying embedded link objects), and fetches the web pages identified by those embedded links (prior to receiving any follow-up request therefor). The satellite gateway sends the pre-fetched content back to the requesting end (e.g., to the satellite terminal at the eNodeB) to be cached in case of a subsequent request by the UE browser for one or more of the pre-fetched embedded site content. Accordingly, if the UE web browser then requests the content of an embedded site, the content can be provided from the cached content without going through the process of a further HTTP GET/RESPONSE exchange over the satellite link. In accordance with further example embodiments, HTTP acceleration functions may include the Dynamic execution of JavaScript during pre-fetching, whereby Javascript is executed to identify and pre-fetch content of links that are embedded in Javascript. Further, in accordance with example embodiments, HTTP acceleration functions may also include pre-fetching of DNS resolutions and DNS caching, whereby DNS queries are responded to based on the DNS cache of the eNodeB VSAT, and prefetching of DNS resolutions before the UE browser requests the translation. Additionally, HTTP acceleration functions may further include the selective bypass for bulk-sized objects that will not benefit from HTTP acceleration.

Once the HTTP acceleration functions are accordingly applied with respect to the extracted GTP payload or IP segment, the resulting packets (the HTTP backbone traffic) are transmitted over the satellite link (S515). At the receiving end, the HTTP acceleration functions are appropriately addressed (e.g., by pre-fetching and transmitting the embedded content) and/or terminated (S517). Accordingly, as with the application of the PEP functions, the VSAT at the eNodeB sites and the satellite gateway at the core network serve as respective proxies for applying the acceleration functions over the satellite link, and performing the appropriate messaging back to the respective clients and servers to make the acceleration transparent to and compatible with the operation of these nodes. The HTTP acceleration layer on the remote end also receives the GTP tunnel identifier or TEID, and passes it on to the GTP regeneration layer. For example, in the case of the core network satellite gateway, acting as the proxy for the core network, the satellite gateway performs all corresponding functions required to facilitate the HTTP acceleration and format the traffic flows and generate the requisite handshaking that will be expected by the core network and further networks (e.g., the Internet).

Finally, the resulting IP segment packets are passed on to the GTP regeneration layer, where the received data is re-encapsulated into GTP T-PDUs (S519). By way of example, as part of this step, a new GTP header is created with the proper TEID, and a new sequence number may be assigned to the packet. In this context, as with the application of PEP functions, because the GTP tunnel was terminated at the transmitting end, there may not be (and need not be) a one-to-one correspondence between the GTP packets received at the transmitting end and the packets received at the receiving end. Accordingly, by way of further example, the receiving node (e.g., the satellite gateway at the core network or a satellite terminal at an eNodeB site) tracks and controls the regenerated GTP packet sequencing that will be applied for purposes of further transmissions through the network (e.g., transmission by the satellite gateway on to the core network, or transmission by the eNodeB VSAT on to the UEs). The re-encapsulated GTP tunnel packets are then transmitted further through the network (e.g., in the case of the core network satellite gateway, transmitted on to the core network, or, in the case of the satellite terminals at the eNodeB sites, transmitted on to the UEs) (S519).

Figure 6:
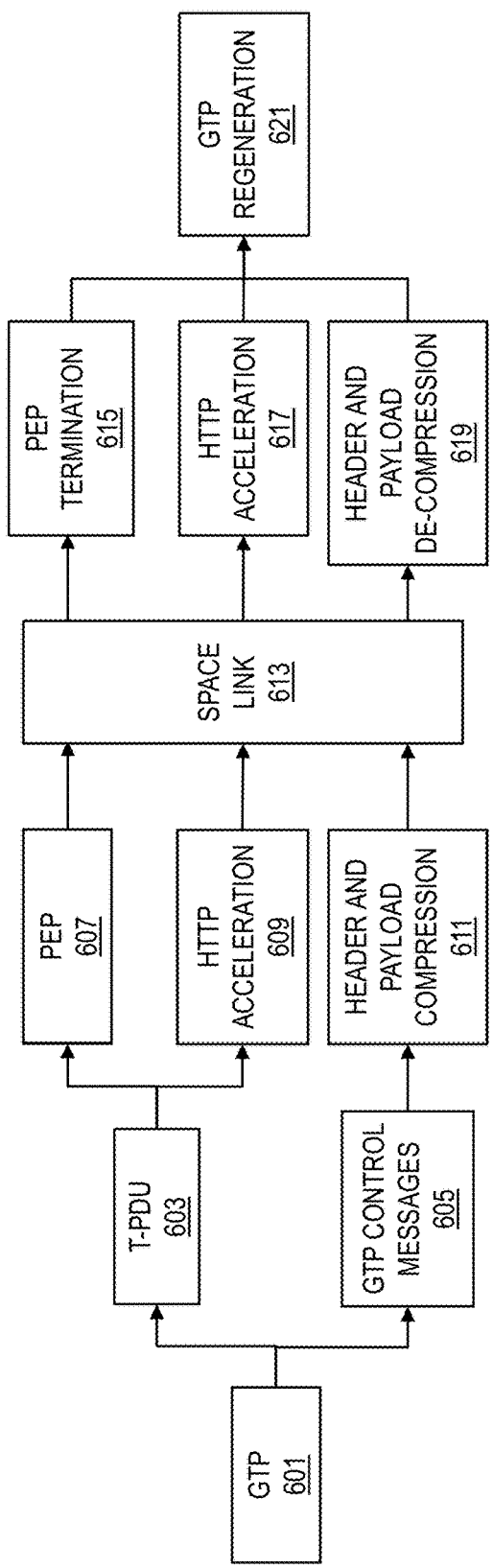
FIG. 6 illustrates a block diagram depicting the processing of GTP extracted packets in multiple acceleration streams, whereby the GTP packets are regenerated and the acceleration streams are merged, in accordance with example embodiments of the present invention.

FIG. 6 illustrates a block diagram depicting the processing of GTP extracted packets in multiple acceleration streams, whereby the GTP packets are regenerated and the acceleration streams are merged (e.g., splitting and merging of PEP and HTTP accelerated traffic streams), in accordance with example embodiments of the present invention. By way of example, the GTP packets 601 are separated into a T-PDU packet stream 603 of user-plane data packets, and a GTP control packet stream 605. The packets of the T-PDU stream are processed, and the PEP acceleration functions 607 and HTTP acceleration functions 609 are applied accordingly. By way of further example, header and payload compression are applied 611 to the GTP control message packets. Header compression may be applied in accordance with one or more available header compression schemes practiced in the art of packet data transmissions (or with any newly devised header compression scheme). With any such compression scheme, the headers of the GTP control message packets would be applied after the GTP protocol in terminated. At the receiving end, the packets would be subjected to a corresponding header decompression process, and the regenerated packets would be re-encapsulated according the respective GTP protocol. The PEP 607, HTTP acceleration 609 and header/payload compression 611 streams are transmitted over the space link 613. The PEP stream is received and the PEP function is terminated accordingly 615. Further, the HTTP acceleration stream is received and the appropriate processing (e.g., pre-fetching is performed) 617. Also, header/payload compression stream is received and the compression is reversed, accordingly 619).

After the acceleration processing is completed for the respective streams, the streams are combined and forwarded on to the GTP re-generation layer 621. By way of example, during the GTP packet re-generation, the tunnel IDs or TEIDs are inserted accordingly, and new GTP sequence numbers are assigned to the packets as a combined stream. The preserved TEIDs ensure that each packet is associated with the proper PDP context and thus reaches the intended destination based on corresponding addressing within the internal protocol headers. Then, at the final destination the packets and correspondingly the messages are decoded and recreated accordingly. In accordance with example embodiments, the acceleration streams for different protocols are thereby processed independently, and thus acceleration backbones for different protocols can be optimized to suit the unique needs of the respective protocols. Additionally, because the underlying IP protocol does not require that overall order be maintained in the transmission of the packets, the splitting up of the packets for the different acceleration functions (which thereby may result in transmission of the packets in a different overall order than as received), will not affect the decoding of the IP packets at the destination device. According to one embodiment, however, the transmission order is maintained with respect to each acceleration function and the transmission over the respective backbone (via the satellite link). Further, there is no delay or extraneous processing required when acceleration streams are merged, and the merge operation is not dependent on packet sequencing across streams.

Figure 7:
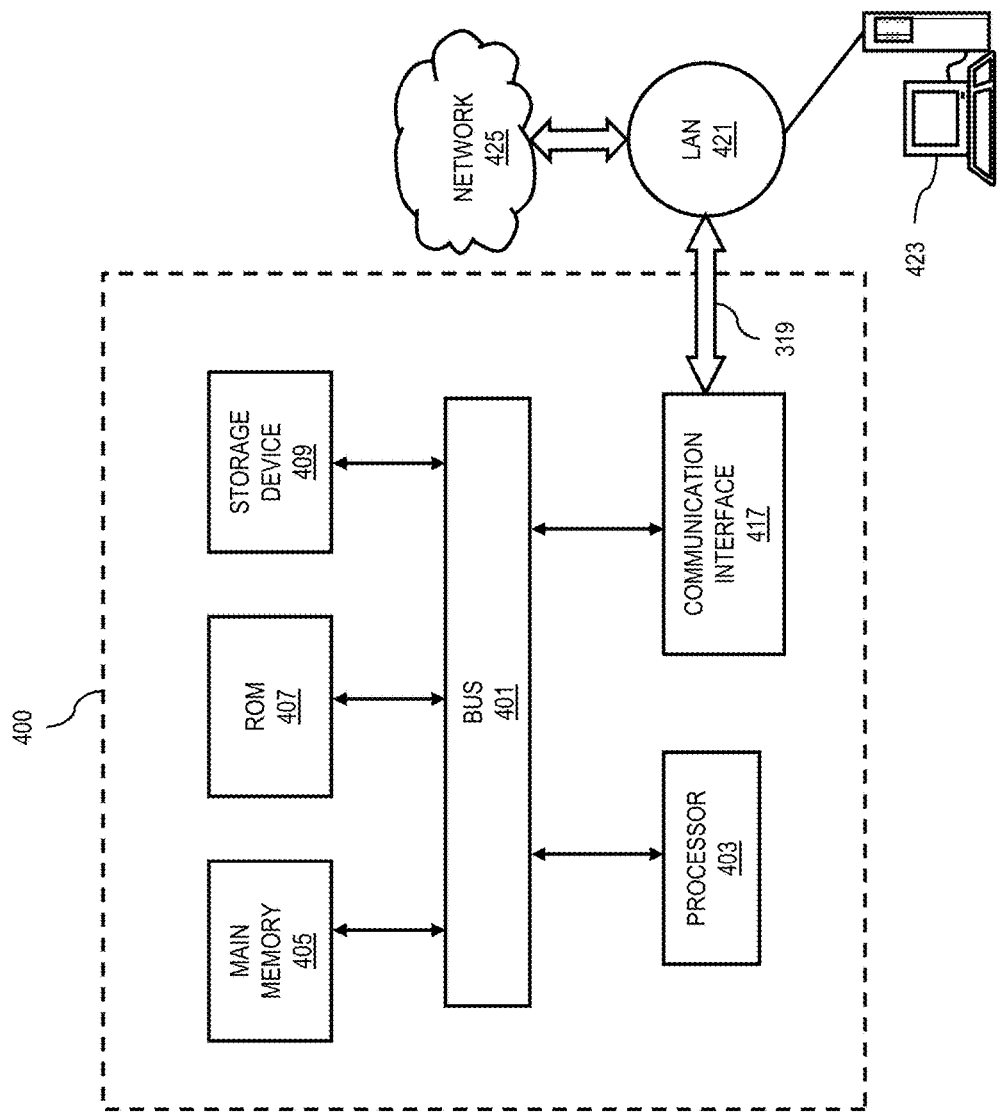
FIG. 7 illustrates a computer system upon which exemplary embodiments according to the present invention can be implemented.

FIG. 7 illustrates a computer system upon which exemplary embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

According to one embodiment of the invention, approaches to facilitate the application of network acceleration technologies to remote node backhaul traffic carried over GPRS tunneling protocols are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device, or other non-volatile storage for later execution.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media may include dynamic memory, such as main memory 405. Transmission media may include coaxial cables, copper wire and fiber optics, including the wires that comprise bus 401. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention. The specification and drawings are accordingly to be regarded in an illustrative rather than restrictive sense.

What is claimed is:

1. A method comprising:
receiving, by a device of a first node of a communications network, a stream of data packets that are encapsulated in accordance with general packet radio service tunneling protocol (GTP), wherein each packet comprises GTP payload data (GPD);
de-encapsulating each GTP data packet by stripping GTP header information from the packet, identifying a tunnel endpoint identifier (TEID) reflecting a respective GTP tunnel with which the GTP packet is associated, and maintaining the GPD;
establishing an acceleration data connection between the first node and a second node of the communications network, and processing the GPD to generate acceleration data packets in accordance with one or more acceleration protocols for transmission of the acceleration data packets to the second node via the acceleration data connection, wherein the TEID is excluded from each acceleration data packet; and
transmitting the resulting acceleration data packets to the second node of the communications network via the acceleration data connection; and
wherein the establishment of the acceleration data connection includes communicating the respective TEID to the second node via handshake messaging to associate the acceleration data connection with the respective GTP tunnel and to facilitate encapsulation of the GPD at the second node in accordance with the GTP protocol.

2. The method of claim 1, further comprising:
receiving, by a device of the second node of the communications network, the transmitted acceleration data packets;
processing the received acceleration data packets, in accordance with the GTP protocol, to encapsulate the GPD in new GTP packets, based at least in part on the respective TEID of the packet provided to the second node via the handshake messaging of the acceleration data connection.

3. The method of claim 1, wherein the device of the first node comprises a performance enhancing proxy (PEP)

device of a user equipment (UE) node of the communications network, and the device of the second node comprises a PEP device of a core network node of the communications network.

4. The method of claim 3, wherein the communications network comprises a terrestrial radio frequency (RF) communications network, having a microwave communications network as the communications link(s) between the device of the first node and the device of the second node.

5. The method of claim 1, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

6. The method of claim 1, further comprising:
grouping the de-encapsulated GTP payload PDUs into separate transmission groups based on a respective type of each PDU; and
wherein the application of the acceleration functions to the GTP payload PDUs comprises applying one or more acceleration functions to each PDU group based on the PDU types contained within the group.

7. The method of claim 6, wherein the transmission of the resulting acceleration PDU packets of each group over the links of the communications network is performed in a channelized manner based on the acceleration function(s) applied to the group.

8. The method of claim 6, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

9. An apparatus, of a first node of a communications network, comprising:
a receiver configured to receive a stream of data packets that are encapsulated in accordance with general packet radio service tunneling protocol (GTP), wherein each packet comprises GTP payload data (GPD);
a processor configured to de-encapsulate each GTP data packet by stripping GTP header information from the packet, identifying a tunnel endpoint identifier (TEID) reflecting a respective GTP tunnel with which the GTP packet is associated, and maintaining the GPD;
an acceleration processor configured to establish an acceleration data connection between the first node and a second node of the communications network, and to process the GPD to generate acceleration data packets in accordance with one or more acceleration protocols for transmission of the acceleration data packets to the second node via the acceleration data connection, wherein the TEID is excluded from each acceleration data packet; and
a transmitter configured to transmit the resulting acceleration data packets to the second node of the communications network via the acceleration data connection; and
wherein the establishment of the acceleration data connection includes communicating the respective TEID to the second node via handshake messaging to associate the acceleration data connection with the respective GTP tunnel and to facilitate encapsulation of the GPD at the second node in accordance with the GTP protocol.

10. The apparatus of claim 9, wherein the apparatus comprises a performance enhancing proxy (PEP) device of a user equipment (UE) node of the communications network, and the device of the second node comprises a PEP device of a core network node of the communications network.

11. The apparatus of claim 10, wherein the communications network comprises a terrestrial radio frequency (RF) communications network, having a microwave communications network as the communications link(s) between the apparatus of the first node and the device of the second node.

12. The apparatus of claim 9, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

13. The apparatus of claim 9 wherein the processor is further configured to group the de-encapsulated GTP payload PDUs into separate transmission groups based on a respective type of each PDU, and wherein the acceleration processor is further configured to apply the acceleration functions to the GTP payload PDUs by applying one or more acceleration functions to each PDU group based on the PDU types contained within the group.

14. The apparatus of claim 13, wherein the transmitter is further configured to transmit the resulting acceleration PDU packets of each group over the links of the communications network in a channelized manner based on the acceleration function(s) applied to the group.

15. The apparatus of claim 13, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

16. A communications network comprising:
a first device of a first node of the communications network, comprising:
a receiver configured to receive a stream of data packets that are encapsulated in accordance with general packet radio service tunneling protocol (GTP), wherein each packet comprises GTP payload data (GPD);
a processor configured to de-encapsulate each GTP data packet by stripping GTP header information from the packet, identifying a tunnel endpoint identifier (TEID) reflecting a respective GTP tunnel with which the GTP packet is associated, and maintaining the GPD;
an acceleration processor configured to establish an acceleration data connection between the first node and a second node of the communications network, and to process the GPD to generate acceleration data packets in accordance with one or more acceleration protocols for transmission of the acceleration data packets to the second node via the acceleration data connection, wherein the TEID is excluded from each acceleration data packet, and wherein the establishment of the acceleration data connection includes communicating the respective TEID to the second node via handshake messaging to associate the acceleration data connection with the respective GTP tunnel; and
a transmitter configured to transmit the resulting acceleration data packets to a second node of the communications network via the acceleration data connection; and a second device of the second node of the communications network, comprising:
    a receiver configured to receive the acceleration data packets transmitted via the acceleration data connection; and
    a processor configured to process the received acceleration data packets, in accordance with the GTP protocol, to encapsulate the GPD in new GTP packets, based at least in part on the respective TEID provided to the second node via the handshake messaging of the acceleration data connection.

17. The communications network of claim 16, wherein the first device includes a performance enhancing proxy (PEP) device of a user equipment (UE) node of the communications network, and the second device includes a PEP device of a core network node of the communications network.

18. The communications network of claim 17, wherein the network comprises a terrestrial radio frequency (RF) communications network, having a microwave communications network as the communications link(s) between the apparatus of the first node and the device of the second node.

19. The communications network of claim 16, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

20. The communications network of claim 16 wherein the processor of the first device is further configured to group the de-encapsulated GTP payload PDUs into separate transmission groups based on a respective type of each PDU, and wherein the acceleration processor of the first device is further configured to apply the acceleration functions to the GTP payload PDUs by applying one or more acceleration functions to each PDU group based on the PDU types contained within the group.

21. The communications network of claim 20, wherein the transmitter of the first device is further configured to transmit the resulting acceleration PDU packets of each group over the links of the communications network in a channelized manner based on the acceleration function(s) applied to the group.

22. The communications network of claim 20, wherein the acceleration functions comprise one or more of a performance enhancing proxy (PEP) handshake and message acknowledgement spoofing function, a hypertext transfer protocol (HTTP) acceleration function, a website pre-fetch function, and a data compression function.

* * * * *